(12) United States Patent
Ohwe et al.

(10) Patent No.: US 7,701,670 B2
(45) Date of Patent: Apr. 20, 2010

(54) HEAD SLIDER CAPABLE OF BEING RELIABLY RELEASED FROM EFFECT OF MOVING RECORDING MEDIUM

(75) Inventors: Takeshi Ohwe, Kawasaki (JP); Atsushi Suzuki, Kawasaki (JP); Hiroshi Takekawa, Tokyo (JP); Kazuhiro Watanabe, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 51 days.

(21) Appl. No.: 12/033,450

(22) Filed: Feb. 19, 2008

(65) Prior Publication Data

US 2008/0144222 A1 Jun. 19, 2008

Related U.S. Application Data

(62) Division of application No. 10/712,982, filed on Nov. 13, 2003, now Pat. No. 7,369,365.

(30) Foreign Application Priority Data

Nov. 13, 2002 (JP) ............................. 2002-329148

(51) Int. Cl.
*G11B 5/60* (2006.01)
(52) U.S. Cl. .................................................. 360/235.8
(58) Field of Classification Search .............. 360/235.8, 360/236.3, 236.5
See application file for complete search history.

(56) References Cited

U.S. PATENT DOCUMENTS

| 5,748,408 | A | 5/1998 | Barrois et al. |
|---|---|---|---|
| 5,774,304 | A | 6/1998 | Crane et al. |
| 6,229,672 | B1 | 5/2001 | Lee et al. |
| 6,477,013 | B1 * | 11/2002 | Kang et al. ............... 360/236.3 |
| 6,646,832 | B2 | 11/2003 | Anaya-Dufresne et al. |
| 6,903,901 | B2 | 6/2005 | Kasamatsu et al. |
| 6,934,122 | B2 | 8/2005 | Boutaghou et al. |
| 6,943,989 | B2 | 9/2005 | Cha et al. |
| 2002/0030938 | A1 | 3/2002 | Boutaghou et al. |

(Continued)

FOREIGN PATENT DOCUMENTS

JP   2001-176228   6/2001

(Continued)

*Primary Examiner*—Allen T Cao
(74) *Attorney, Agent, or Firm*—Greer, Burns & Crain, Ltd.

(57) ABSTRACT

A medium-opposed surface of a slider body is hemisected into first and second areas by the centerline extending in the longitudinal direction of the slider body. The second area is designed to generate a positive pressure larger than that generated at the first area when a load acting on the slider body in a direction toward a recording medium decreases. The head slider of the type is allowed to enjoy the imbalance of the lift on the slider body. This imbalance can be utilized to intentionally induce increases in the roll angle and the pitch angle of the slider body. The increase in the roll and pitch angles causes disappearance of the lift and the negative pressure generated at the medium-opposed surface. The head slider can reliably be distanced from the moving surface of the recording medium solely with the assistance of the airflow acting on the medium-opposed surface.

2 Claims, 6 Drawing Sheets

U.S. PATENT DOCUMENTS

| | | |
|---|---|---|
| 2002/0131209 A1* | 9/2002 | Anaya-Dufresne et al. ....... 360/236.2 |
| 2003/0184915 A1 | 10/2003 | Kameyama et al. |
| 2003/0227717 A1 | 12/2003 | Cha et al. |
| 2004/0066581 A1 | 4/2004 | Kameyama |
| 2004/0075947 A1 | 4/2004 | Ohwe |
| 2004/0150913 A1 | 8/2004 | Yoshida et al. |
| 2005/0099728 A1 | 5/2005 | Deng et al. |
| 2005/0105216 A1 | 5/2005 | Ueno et al. |
| 2005/0190501 A1 | 9/2005 | Boutaghou et al. |

FOREIGN PATENT DOCUMENTS

| | | |
|---|---|---|
| JP | 2002-230732 | 8/2002 |
| JP | 2002-312917 | 10/2002 |

* cited by examiner

HEAD SLIDER CAPABLE OF BEING RELIABLY RELEASED FROM EFFECT OF MOVING RECORDING MEDIUM

This application is a divisional of application Ser. No. 10/712,982, filed Nov. 13, 2003.

BACKGROUND OF THE INVENTION

1. Field of the Invention

The present invention relates to a recording medium drive or storage device designed to utilize a recording medium such as a magnetic recording disk for managing information data, for example. In particular, the invention relates to a recording medium drive such as a hard disk drive (HDD) comprising a so-called load/unload mechanism.

2. Description of the Prior Art

A hard disk drive (HDD) sometimes comprises a load/unload mechanism. In general, the load/unload mechanism comprises a load bar extending in the forward direction from the tip or front end of a load beam, and a ramp member located outside a magnetic recording disk so as to define a slope along the path of movement of the load bar. The load bar is allowed to climb up the slope before the magnetic recording disk stops rotating. As the load bar keeps climbing, the front end of the load beam gets remoter from the surface of the rotating magnetic recording disk. When the front end of the load beam is lifted above the magnetic recording disk in this manner, a head slider is allowed to get distanced from the surface of the rotating magnetic recording disk.

A so-called limiter is utilized to get the head slider remote from the surface of the rotating magnetic recording disk. The limiter is in general attached to the load beam or a gimbal actually supporting the head slider. When the front end of the load beam is lifted to a predetermined elevation above the surface of the rotating magnetic recording disk, a part of the gimbal or load beam is engaged with the limiter. The lift of the load bar is in this manner physically related to the gimbal or load beam. The gimbal or load beam is lifted so that the head slider is allowed to get distanced from the surface of the rotating magnetic recording disk.

The limiter of the aforementioned load/unload mechanism must be made or produced at a higher accuracy. If a space or distance is too large between the limiter and the gimbal or load beam, the limiter cannot be engaged with the gimbal or load beam irrespective of the lift of the load beam. Accordingly, the head slider cannot be distanced from the surface of the magnetic recording disk.

SUMMARY OF THE INVENTION

It is accordingly an object of the present invention to provide a recording medium drive capable of reliably distancing a head slider away from the surface of a recording medium when a load bar reaches a predetermined elevation above the surface of the recording medium.

According to a first aspect of the present invention, there is provided a head slider comprising: a slider body defining a medium-opposed surface hemisected into first and second areas by the centerline extending in the longitudinal direction of the slider body. The second area is designed to generate a positive pressure larger than a positive pressure generated at the first area when a load acting on the slider body in a direction toward a recording medium decreases.

The head slider of the type is allowed to enjoy the imbalance of the lift or positive pressure on the slider body. This imbalance can be utilized to intentionally induce increases in the roll angle and the pitch angle of the slider body. The increase in the roll and pitch angles causes disappearance of the lift as well as the negative pressure generated at the medium-opposed surface of the slider body. The head slider in this manner can reliably be distanced from the moving surface of the recording medium solely with the assistance of the airflow acting on the medium-opposed surface of the slider body. Here, the pitch angle is defined as an inclined angle in the longitudinal direction of the slider body. The roll angle is defined as an inclined angle in the direction perpendicular to the longitudinal direction of the slider body.

According to a second aspect of the present invention, there is provided a recording medium drive comprising: a recording medium; a head slider opposed to the recording medium at the front end of a head suspension; a load bar extending in the forward direction from the front end of the head suspension; and a ramp member located outside the recording medium so as to define a slope along a path of movement of the load bar. The head slider includes a slider body defining a medium-opposed surface hemisected into first and second areas by the centerline extending in the longitudinal direction of the slider body. In this case, the second area is designed to generate a positive pressure larger than a positive pressure generated at the first area when a load acting on the slider body in a direction toward the recording medium decreases. Here, the head suspension may comprise a load beam and a gimbal, for example. The combination of the load bar and the ramp member establishes a so-called load/unload mechanism.

Now, assume that the load bar is received on the ramp member before the stoppage of the recording medium. When the load bar climbs up the slope, the load or urging force applied to the head slider from the load bar decreases. A further upward movement of the load bar along the slope causes the head slider to be substantially released from the urging force from the head suspension. At this moment, the head slider of the type is allowed to enjoy the imbalance of the lift or positive pressure on the slider body. This imbalance can be utilized to intentionally induce increases in the roll angle and the pitch angle of the slider body. The increase in the roll and pitch angles causes disappearance of the lift as well as the negative pressure generated at the medium-opposed surface of the slider body. The head slider in this manner can reliably be distanced from the moving surface of the recording medium, solely with the assistance of the airflow acting on the medium-opposed surface of the slider body, without the assistance of a so-called limiter. The head slider is allowed to reliably get distanced from the moving surface of the recording medium when the load bar has reached a predetermined elevation above the moving surface of the recording medium.

According to a third aspect of the present invention, there is provided a head slider comprising: a slider body defining a medium-opposed surface hemisected into first and second areas by the centerline extending in the longitudinal direction of the slider body; a front air bearing surface defined on the medium-opposed surface at a position near the inflow end of the medium-opposed surface; and a rear air bearing surface defined on the medium-opposed surface at a position near the outflow end of the medium-opposed surface. The front air bearing surface is located closer to the outflow end at the second area than at the first area.

The head slider allows generation of a lift at the front and rear air bearing surfaces. Moreover, a larger lift is in general set at the front air bearing surface rather than the rear air bearing surface. The head slider is allowed to keep an attitude of a predetermined pitch angle in this manner. The front air bearing surface is located closer to the outflow end at the second area than at the first area in the head slider, so that the influence of the airflow is relatively maintained at the second area rather than the first area upon an increase in the elevation above the moving surface of the recording medium. This is because the pitch angle of the head slider allows the slider body to approach the recording medium near the outflow end rather than the inflow end. The positive pressure is maintained at the front air bearing surface on the second area, even though the positive pressure immediately decreases at the front air bearing surface on the first area. The imbalance of the lift or positive pressure on the slider body in this manner can be utilized to intentionally induce increases in the roll angle and the pitch angle of the slider body. The increase in the roll and pitch angles causes disappearance of the lift as well as the negative pressure generated at the medium-opposed surface of the slider body. The head slider in this manner can reliably be distanced from the moving surface of the recording medium, solely with the assistance of the airflow acting on the medium-opposed surface of the slider body, without the assistance of a so-called limiter.

According to a fourth aspect of the present invention, there is provided a head slider comprising: a slider body defining a medium-opposed surface hemisected into first and second areas by the centerline extending in the longitudinal direction of the slider body; a front air bearing surface defined on the medium-opposed surface at a position near the inflow end of the medium-opposed surface; and a rear air bearing surface defined on the medium-opposed surface. The rear air bearing surface is located closer to the outflow end of the medium-opposed surface than the front air bearing surface. In this case, the outflow end of the front air bearing surface is located closer to the outflow end of the medium-opposed surface at the second area than at the first area.

The head slider of the type is designed to keep the influence of the airflow relatively at the second area rather than the first area upon an increase in the elevation in the same manner as described above, since the outflow end of the front air bearing surface is located closer to the outflow end at the second area than at the first area in the head slider. The positive pressure is maintained at the front air bearing surface on the second area, even though the positive pressure immediately decreases at the front air bearing surface on the first area. The imbalance of the lift or positive pressure on the slider body in this manner can be utilized to intentionally induce increases in the roll angle and the pitch angle of the slider body. The increase in the roll and pitch angles causes disappearance of the lift as well as the negative pressure generated at the medium-opposed surface of the slider body. The head slider in this manner can reliably be distanced from the moving surface of the recording medium, solely with the assistance of the airflow acting on the medium-opposed surface of the slider body, without the assistance of a so-called limiter.

According to a fifth aspect of the present invention, there is provided a head slider comprising: a slider body defining a medium-opposed surface hemisected into first and second areas by the centerline extending in the longitudinal direction of the slider body; a front air bearing surface defined on the medium-opposed surface at a position near the inflow end of the medium-opposed surface; and a rear air bearing surface defined on the medium-opposed surface. The rear air bearing surface is located closer to the outflow end of the medium-opposed surface than the front air bearing surface. The inflow end of the front air bearing surface is located closer to the outflow end of the medium-opposed surface at the second area than at the first area.

The head slider of the type is designed to keep the influence of the airflow relatively at the second area rather than the first area upon an increase in the elevation in the same manner as described above, since the inflow end of the front air bearing surface is located closer to the outflow end at the second area than at the first area in the head slider. The positive pressure is maintained at the front air bearing surface on the second area, even though the positive pressure immediately decreases at the front air bearing surface on the first area. The imbalance of the lift or positive pressure on the slider body in this manner can be utilized to intentionally induce increases in the roll angle and the pitch angle of the slider body. The increase in the roll and pitch angles causes disappearance of the lift as well as the negative pressure generated at the medium-opposed surface of the slider body. The head slider in this manner can reliably be distanced from the moving surface of the recording medium, solely with the assistance of the airflow acting on the medium-opposed surface of the slider body, without the assistance of a so-called limiter.

In any event, the aforementioned head sliders may be assembled into a head suspension assembly, for example. The head suspension assembly may additionally comprise a load beam and a load bar extending in the forward direction from the front end of the load beam, for example. The load beam and the load bar may be integral based on a common material. A gimbal may be attached to the load beam for receiving the head slider.

In any cases, the aforementioned head suspension assembly may be incorporated within a recording medium drive such as a hard disk drive (HDD). The recording medium drive may further comprise a recording medium, a ramp member located outside the recording medium so as to define a slope along a path of movement of the load bar, and the like.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
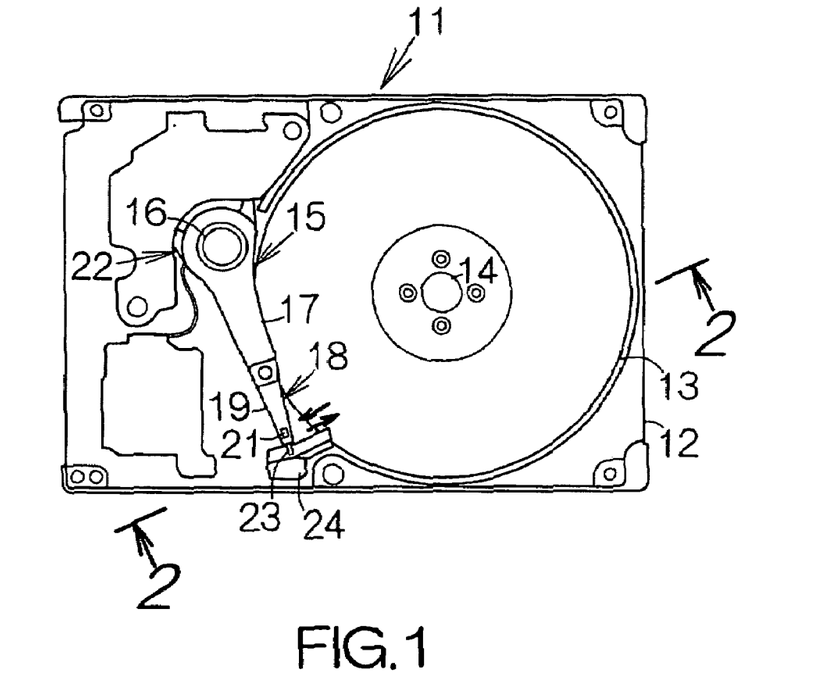
FIG. 1 is a plan view schematically illustrating the structure of a hard disk drive (HDD) as a specific example of a recording medium drive.

FIG. 1 schematically illustrates the inner structure of a hard disk drive (HDD) 11 as an example of a magnetic recording medium drive or storage device. The HDD 11 includes a box-shaped main enclosure 12 defining an inner space of a flat parallelepiped, for example. At least one magnetic recording disk 13 is mounted on the driving shaft of a spindle motor 14 within the main enclosure 12. The spindle motor 14 is allowed to drive the magnetic recording disk 13 for rotation at a higher revolution speed such as 4,200 rpm, 5,400 rpm, 7,200 rpm, 10,000 rpm, or the like, for example. A cover, not shown, is coupled to the main enclosure 12 so as to define the closed inner space between the main enclosure 12 and the cover itself.

A head actuator 15 is also accommodated in the inner space of the main enclosure 12. The head actuator 15 is coupled to a vertical support shaft 16 for relative rotation. The head actuator 15 comprises actuator arms 17 extending in the horizontal direction from the vertical support shaft 16, and head suspension assemblies 18 respectively attached to the tip ends of the actuator arms 17 so as to extend in the forward direction from the actuator arms 17. The actuator arms 17 are related to the front and back surfaces of the magnetic recording disk 13.

The head suspension assembly 18 comprises a load beam 19. The load beam 19 is connected to the front or tip end of the actuator arm 17 through a so-called elastic bend section. The elastic bend section establishes an elasticity urging the front or tip end of the load beam 19 toward the surface of the magnetic recording disk 13. A flying head slider 21 is supported on the front end of the load beam 19. The flying head slider 21 is received on a gimbal, not shown, attached to the load beam 19. The gimbal serves to allow the flying head slider 21 to change its attitude.

As is apparent from FIG. 1, the actuator arm 17 is positioned at a predetermined inoperative or unload position when the magnetic recording disk 13 stands still. When the actuator arm 21 takes the inoperative position, the actuator arm 21 brings the tip end of the head suspension assembly 18 outside the outer periphery of the magnetic recording disk 13. The actuator arm 17 is allowed to swing about the support shaft 16 from the inoperative position. When the actuator arm 17 swings about the support shaft 16, the tip end of the head suspension assembly 18 moves in the radial direction of the magnetic recording disk 13 across the data zone between the outermost recording track and the innermost recording track. Any driving power source 22 such as a voice coil motor (VCM) may be utilized to realize the swinging movement of the actuator arm 17.

When the magnetic recording disk 13 rotates, the flying head slider 21 is allowed to receive airflow generated along the rotating magnetic recording disk 13. The airflow serves to generate a positive pressure or lift and a negative pressure on the flying head slider 21, as described later in detail. The flying head slider 21 is thus allowed to keep flying above the surface of the magnetic recording disk 13 during the rotation of the magnetic recording disk 13 at a higher stability established by the balance between the urging force of the load beam 19 and the lift as well as the negative pressure. When the actuator arm 17 is driven to swing in the aforementioned manner during the flight of the flying head slider 21, the flying head slider 21 can be positioned right above a target recording track on the magnetic recording disk 13. When the actuator arm 17 is positioned at the inoperative position, the flying head slider 21 reaches a position outside the magnetic recording disk 13 beyond the outermost recording track.

A load bar 23 is attached to the front end of the individual load beam 19. The load bar 23 further extends in the forward direction from the load beam 19. The load bar 23 is allowed to move in the radial direction of the magnetic recording disk 13 based on the swinging movement of the actuator arm 17. A ramp member 24 is located outside the magnetic recording disk 13 on the path of movement of the load bars 23. When the actuator arms 17 are positioned at the inoperative position, the load bars 23 are received on the ramp member 24. The combination of the load bars 23 and the ramp member 24 establishes a so-called load/unload mechanism.

Figure 2:
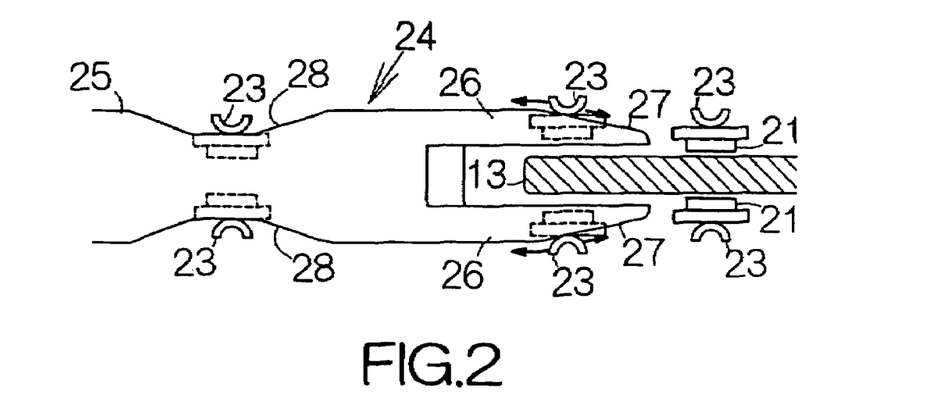
FIG. 2 is an enlarged partial sectional view taken along the line 2-2 in FIG. 1.

As shown in FIG. 2, the ramp member 24 includes an attachment base, not shown, screwed on the bottom plate of the main enclosure 12. Arm members 25 extend from the attachment base in the horizontal direction toward the rotation axis of the magnetic recording disk 13 in the ramp member 24. A pair of ramps 26 are integrally formed on the individual arm member 25. The ramps 26 are designed to face the marginal zones outside the outermost recording tracks over the front and back surfaces of the magnetic recording disk 13. A slope 27 is defined on the individual ramp 26. The slope 27 is designed to get remote from the surface of the magnetic recording disk 13 at the outer location in the radial direction of the magnetic recording disk 13. The slope 27 is positioned on the path of movement of the load bar 23.

Now, assume that the magnetic recording disk 13 stops rotating. When read/write operations have been completed, the driving power source 22 drives the actuator arm 17 in a normal direction toward the inoperative position. When the flying head slider 21 gets opposed to the marginal or landing zone outside the outermost recording track, the load bar 23 is allowed to contact the slope 27 of the ramp 26. A further swinging movement of the actuator arm 17 allows the load bar 23 to climb up the slope 27. As the load bar 23 climbs the slope 31, the flying head slider 21 gets remote from the surface of the magnetic recording disk 13. The load bar 23 is in this manner received on the ramp member 24. When the actuator arm 17 has reached the inoperative position, the load bar 23 is received in a depression 28 on the ramp member 24. The magnetic recording disk 13 then stops rotating. Since the load bar 23 is reliably held on the ramp member 24, the flying head slider 21 is prevented from colliding or contacting against the magnetic recording disk 13 even without any airflow acting on the flying head slider When the HDD 11 receives instructions to read or write magnetic information, the magnetic recording disk 13 starts to rotate. The driving power source 22 drives the actuator arm 17 in the reserve direction opposite to the aforementioned normal direction after the rotation of the magnetic recording disk 13 has entered the steady condition. The load bar 23 is allowed to move out of the depression 28 toward the slope 27. A further swinging movement of the actuator arm 17 causes the load bar 23 to move down the slope 27.

During the downward movement of the load bar 23, the flying head slider 21 gets opposed to the surface of the rotating magnetic recording disk 13. Airflow generated along the surface of the rotating magnetic recording disk 13 induces a lift on the flying head slider 21. A further swinging movement of the actuator arm 17 allows the load bar 23 to take off from the slope 27 or ramp member 24. Since the magnetic recording disk 13 rotates in the steady condition, the flying head slider 21 can fly above the surface of the magnetic recording disk 13 without a support of the ramp member 24.

Figure 3:
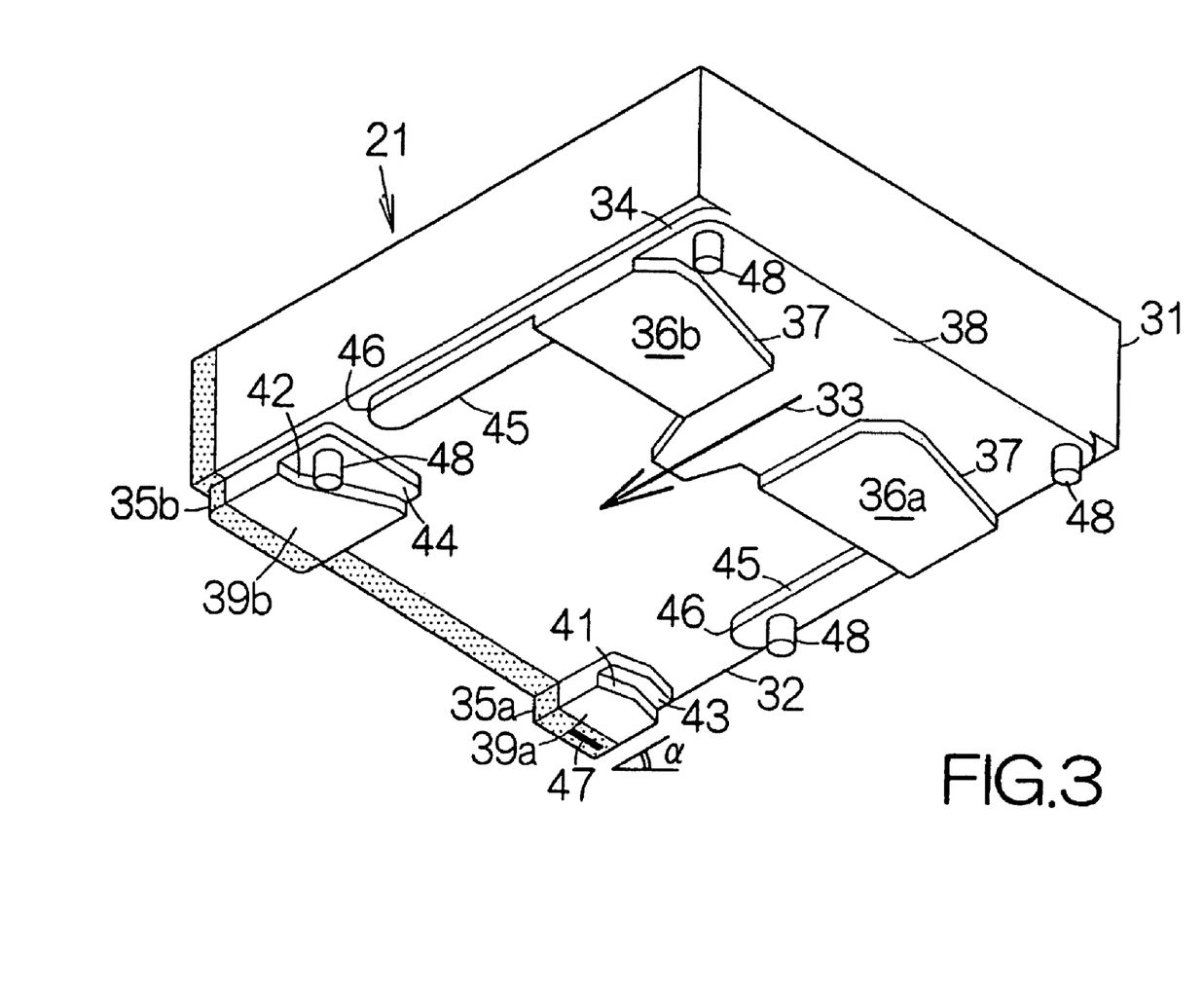
FIG. 3 is an enlarged perspective view schematically illustrating a flying head slider according to a specific example.

FIG. 3 illustrates a specific example of the flying head slider 21 in detail according to an example of the present invention. The flying head slider 21 includes a slider body 31 of a flat parallelepiped, for example. The slider body 31 is designed to oppose a medium-opposed surface or bottom surface to the magnetic recording disk 13. A flat base surface 32 or reference surface is defined on the medium-opposed surface. When the magnetic recording disk 13 rotates, airflow 33 passes along the bottom surface from the front or leading end to the rear or trailing end of the slider body 31. The slider body 31 includes a base, made of $Al_2O_3$—TiC, and $Al_2O_3$ (alumina) film layered over the trailing or outflow end surface of the base. Note that the terms "leading" and "trailing" are defined based on the direction of the airflow 33.

A front rail 34 is formed to stand on the base surface 32 of the slider body 31 near the leading or inflow end of the slider body 31. The term "inflow" is defined based on the direction of the airflow 33 in the same manner as described above. The front rail 34 is designed to extend in the lateral direction of the slider body 31 in parallel with the leading end of the slider body 31. The term "lateral" is defined in the direction perpendicular to the direction of the airflow 33. The height or thickness of the front rail 34 from the base surface 32 may be set approximately at 1.5-2.0 μm, for example.

Likewise, a pair of rear rails 35a, 35b are formed to stand on the base surface 32 of the bottom surface 26 near the trailing or outflow end of the slider body 31. The term "outflow" is likewise defined based on the direction of the airflow 33. The rear rails 35a, 35b are arranged in a row in the lateral direction so as to define an airflow passage for the airflow 33 therebetween. The rear rails 35a, 35b are designed to extend downstream in the rearward direction toward the trailing end of the slider body 31. The height or thickness of the respective rear rails 35a, 35b from the base surface 32 may be set at a predetermined height equal to the aforementioned height of the front rail 34.

A pair of front air bearing surfaces (ABSs) 36a, 36b are defined on the top surface of the front rail 34. The front air bearing surfaces 36a, 36b are designed to extend in the lateral direction of the slider body 31. Steps 37 are defined on the top surface of the front rail 34 at the leading or inflow ends of the individual front air bearing surfaces 36a, 36b. The steps 37 serve to define a lower level surface 38 extending over the top surface of the front rail 34 at a level lower than the front air bearing surfaces 36a, 36b. During the rotation of the magnetic recording disk 13, the airflow 33 generated along the surface of the magnetic recording disk 13 is allowed to flow along the lower level surface 38, the steps 37 and the front air bearing surfaces 36a, 36b in this sequence. The steps 37 enable generation of a larger positive pressure or lift on the front air bearing surfaces 36a, 36b.

First and second rear air bearing surfaces 39a, 39b are respectively defined on the top surfaces of the rear rails 35a, 35b. A step 41 is defined on the top surface of the rear rail 35a at the leading or inflow end of the first rear air bearing surface 39a. Likewise, a step 42 is defined on the top surface of the rear rail 35b at the leading or inflow end of the second rear air bearing surface 39b. The steps 41, 42 serve to define lower level surfaces 43, 44 extending over the top surfaces of the rear rails 35a, 35b, respectively, at a level lower than the first and second rear air bearing surfaces 39a, 39b. During the rotation of the magnetic recording disk 13, the airflow 33 generated along the surface of the magnetic recording disk 13 is allowed to flow along the lower level surfaces 43, 44, the steps 41, 42 and the first and second rear air bearing surfaces 39a, 39b in this sequence. The steps 41, 42 enable generation of a larger positive pressure or lift on the first and second air bearing surfaces 39a, 39b, respectively.

A pair of side rails 45 are formed to stand on the base surface 32 of the slider body 31. The respective side rails 45 are connected to the front rail 34 at its opposite ends in the lateral direction of the slider body 31. The respective side rails 45 are designed to extend toward the trailing end of the slider body 31 from the opposite ends of the front rail 34. Airflow tends to flow around the opposite ends of the front rail 34 after colliding against the front rail 34 when the slider body 31 receives the airflow at the bottom surface during the rotation of the magnetic recording disk 13. The side rails 45 prevents the airflow from entering a space behind the front rail 34 even when the airflow flows around the opposite ends of the front rail 34. The airflow 33 flowing across the front rail 34 is thus easily expanded in the vertical direction upright to the surface of the magnetic recording disk 13. The expansion of the airflow 33 serves to generate a negative pressure behind the front rail 34. The aforementioned lift at the air bearing surfaces 36a, 36b, 39a, 39b is balanced with the negative pressure so as to set the flying height of the flying head slider 21 above the surface of the magnetic recording disk 13. Recesses 46 are defined between the side rails 45 and the corresponding rear rails 35a, 35b, respectively. The recesses 46 serve to introduce the airflow having flowed around the opposite ends of the front rail 34 into a space between the rear rails 35a, 35b. The side rails 45 define the top surfaces, respectively, leveled or flush with the lower level surface 38 on the front rail 34.

A read/write head element 47 is mounted on the slider body 31. The read/write head element 47 is embedded in the alumina film of the slider body 31. Read and write gaps of the read/write head element 47 are allowed to get exposed at the first rear air bearing surface 39a. The read/write head element 47 may include a write element such as a thin film magnetic head utilizing a thin film coil pattern, for example, and a read element such as a giant magnetoresistive (GMR) element, a tunnel-junction magnetoresistive (TMR) element, or the like.

The flying head slider 21 of this type allows generation of a larger positive pressure or lift on the front air bearing surface 36a, 36b rather than the first and second rear air bearing surfaces 39a, 39b. When the slider body 31 flies above the surface of the magnetic recording disk 13, the slider body 31 is kept in an inclined attitude of pitch angle α. The pitch angle α is defined as an inclined angle in the direction of the airflow 33, namely, in the longitudinal direction of the slider body 31. The pitch angles α serves to minimize the distance between the trailing end of the slider body 31 and the surface of the magnetic recording disk 13 near the outflow end rather than the inflow end of the slider body 31.

As is apparent from FIG. 3, adsorption preventing protrusions (pads) 48 are formed on the front rail 34, the rear rail 35b, and the like. The adsorption preventing protrusions 48 are designed to stand on the lower level surfaces 38, 44 and the like. The adsorption preventing protrusions 48 define the tip ends, respectively, located above the level of the front air bearing surfaces 36a, 36b as well as the first and second rear air bearing surfaces 39a, 39b. The absorption preventing protrusions 48 serve to prevent the front air bearing surfaces 36a, 36b and the first and second rear air bearing surfaces 39a, 39b from contacting the surface of the magnetic recording disk 13, even if the flying head slider 21 falls on the surface of the magnetic recording disk 13. A contact area is minimized between the slider body 31 and the magnetic recording disk 13. The slider body 31 is prevented from receiving an adsorption or meniscus effect acting from a lubricating agent or oil spreading over the surface of the magnetic recording disk 13.

Figure 4:
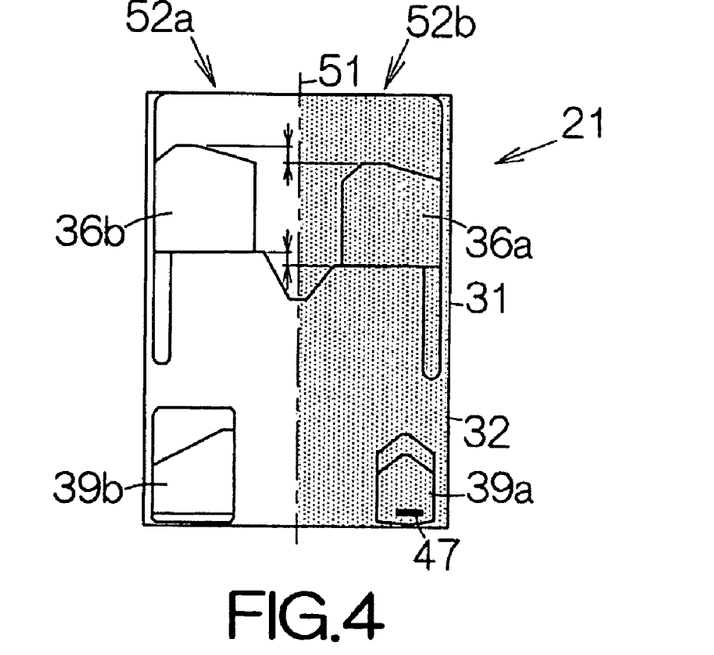
FIG. 4 is a plan view of a medium-opposed surface or bottom surface for schematically illustrating the location of a front air bearing surface (ABS)

As is apparent from FIG. 4, the medium-opposed surface or bottom surface is hemisected into first and second areas 52a, 52b by the centerline 51 extending in the longitudinal direction of the slider body 31. The inflow end of the front air bearing surface 36a on the second area 52b is located closer to the outflow end of the bottom surface as compared with the inflow end of the front air bearing surface 36b on the first area 52a. Likewise, the outflow end of the front air bearing surface 36a on the second area 52b is located closer to the outflow end of the bottom surface as compared with the outflow end of the front air bearing surface 36b on the first area 52a. In this manner, the front air bearing surface 36a on the second area 52b is totally located closer to the outflow end of the slider body 31 rather than the front air bearing surface 36b on the first area 52a. The front air bearing surfaces 36a, 36b asymmetric in this manner serve to establish at the second area 52b over the bottom surface of the slider body 31 a positive pressure larger than the positive pressure generated at the first area 52a when a load or the urging force acting on the slider body 31 from the load beam 19 in the direction toward the magnetic recording disk 13 decreases.

Here, the centerline 51 may coincide with the axis of symmetry of the rectangular base surface 32, for example. Alternatively, the centerline 51 may simultaneously pass through the middle of the inflow end and the middle of the outflow end of the slider body 31. As illustrated, the first rear air bearing surface 39a exposing the read/write head element 47 may be located on the second area 52b. Alternatively, the first rear air bearing surface 39a may be located on the first area 52a.

Now, assume that the load bar 23 is received on the ramp member 24 before the rotation of the magnetic recording disk 13 is terminated. When the load bar 23 climbs up the slope 27, the load or urging force applied to the flying head slider 21 from the load bar 23 decreases. A further upward movement of the load bar 23 along the slope 27 causes a so-called dimple or domed protrusion on the load beam 19 to get distanced from the back of the gimbal. Since the front air bearing surface 36a on the second area 52b is located closer to the outflow end of the bottom surface as compared with the front air bearing surface 36b on the first area 52a, the influence of the airflow is relatively maintained on the front air bearing surface 36a on the second area 52b upon an increase in the elevation while the front air bearing surface 36b on the first area 52a suffers from release from the influence of the airflow. This is because the slider body 31 approaches the magnetic recording disk 13 near the outflow end rather than the inflow end based on the pitch angle α of the flying head slider 21. The positive pressure is maintained at the front air bearing surface 36a on the second area 52b, even though the positive pressure quickly decreases at the front air bearing surface 36b on the first area 52a. The imbalance of the positive pressure induces an increase in the roll angle and the pitch angle α. A sharp increase of the roll angle and pitch angle α in this manner allows the flying head slider 21 to easily get distanced from the moving surface of the rotating magnetic recording disk 13 without assistance of a so-called limiter. The flying head slider 21 is thus allowed to get remote from the rotating magnetic recording disk 13 based on the airflow acting on the bottom surface, so that the flying head slider 21 reliably flies away from the surface of the rotating magnetic recording disk 13 at a predetermined elevation above the surface of the magnetic recording disk 13. Here, the roll angle is defined as an inclined angle in the direction perpendicular to the direction of the airflow 33, namely, in the lateral direction of the slider body 31.

Figure 5:
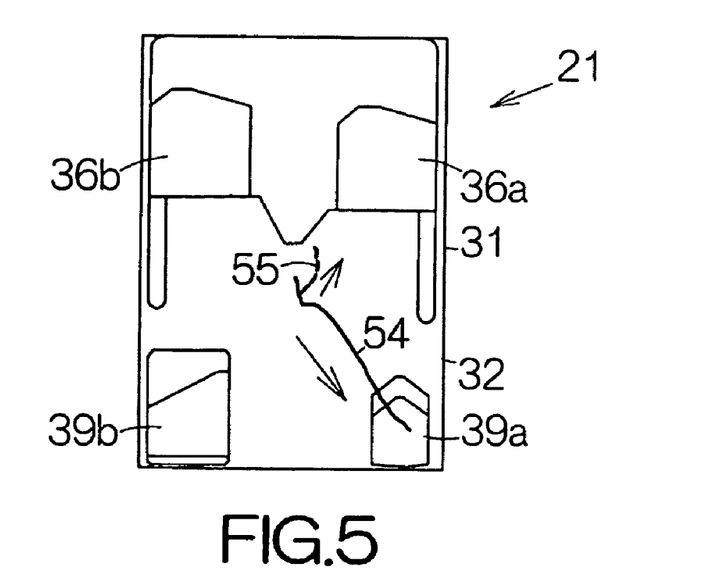
FIG. 5 is a plan view of the medium-opposed surface for schematically illustrating movements of the center of the distribution for positive and negative pressures on the flying head slider according to the embodiment.
Figure 6:
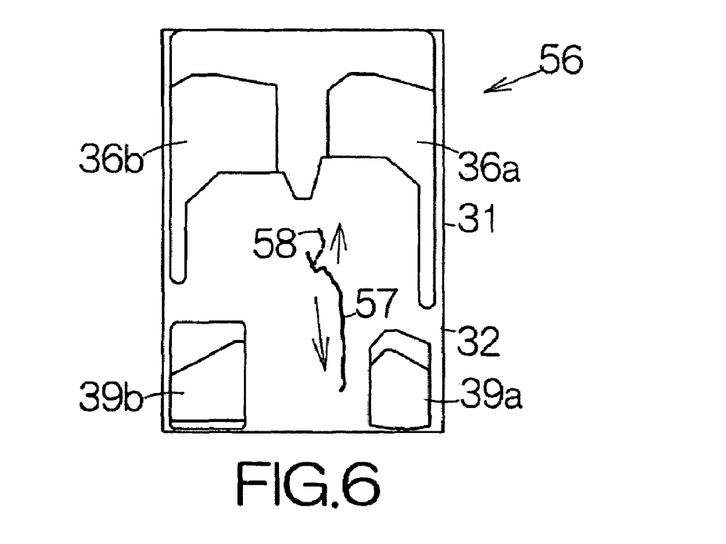
FIG. 6 is a plan view of a medium-opposed surface or bottom surface for schematically illustrating movements of the center of the distribution for positive and negative pressures on a flying head slider according to a comparative example.

The inventors have examined the property of the aforementioned flying head slider 21. The inventors utilized a computer-based simulation so as to observe the distribution of the positive and negative pressure at the bottom surface. The inventors derived the movement of the center of the distribution for the positive pressure as well as of the center of the distribution for the negative pressure. As shown in FIG. 5, when the load beam 19 reduced a load on the flying head slider 21, the center of the distribution of the lift or positive pressure moved on the flying head slider 21 on a path 54 extending along a diagonal line from the center of the rectangular base surface 32. As is apparent from a path 55, the center of the distribution of the negative pressure hardly moved on the flying head slider 21. The inventors have also examined the property of a flying head slider 56 according to a comparative example. The flying head slider 56 was designed to include the outflow end of the front air bearing surface 36a located near the inflow end of the base surface 32 as compared with the outflow end of the front air bearing surface 36b. It has been confirmed that the center of the distribution of the lift or positive pressure moved on the flying head slider 56 on a path 57 extending along the longitudinal centerline from the center of the rectangular base surface 32. As is apparent from a path 58, the center of the distribution of the negative pressure hardly moved on the flying head slider 56.

Figure 7:
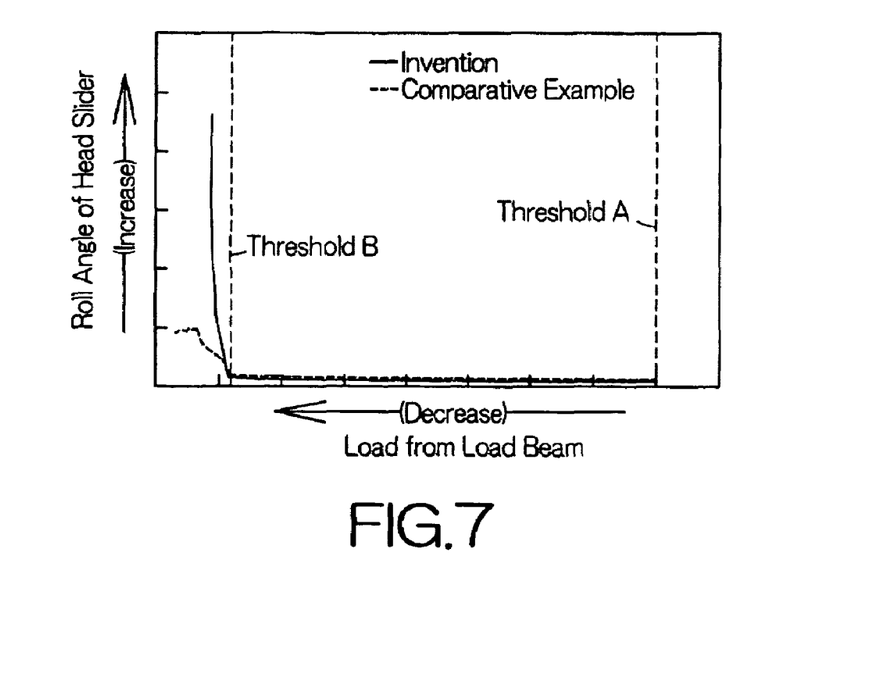
FIG. 7 is a graph illustrating changes in the roll angles of the flying head sliders in response to a decrease in a load or urging force from a load beam.

The inventors have subsequently observed changes in the roll angles of the flying head sliders 21, 56, respectively. As is apparent from FIG. 7, when the load bar 23 climbed up the slope 27 of the ramp member 24, the roll angle of the flying head slider 21, 56 gradually increased by a slight amount between a threshold A and a threshold B. When the load bar 23 reached a predetermined elevation, corresponding to the threshold B, the dimple of the load beam 19 lost contact with the back of the gimbal. After this moment, the roll angle of the flying head slider 21 rapidly increased. On the other hand, an increase in the roll angle of the flying head slider 56 of the comparative example was suppressed within a smaller range. It has been confirmed that the aforementioned asymmetric distribution of the lift or positive pressure during the decrease of a load from the load beam 19 induces a rapid increase in the roll angle of the flying head slider 21.

Figure 8:
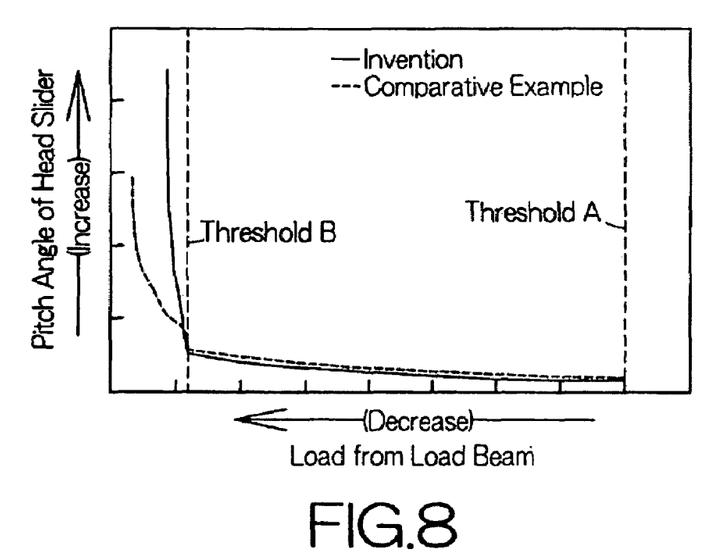
FIG. 8 is a graph illustrating changes in the pitch angles of the flying head sliders in response to a decrease in a load or urging force from the load beam.

The inventors have also observed changes in the pitch angles of the flying head sliders 21, 56, respectively. As is apparent from FIG. 8, when the load bar 23 climbed up the slope 27 of the ramp member 24, the pitch angle of the flying head slider 21, 56 gradually increased by a slight amount between a threshold A and a threshold B. When the load bar 23 reached the predetermined elevation, corresponding to the threshold B, the pitch angle α of the flying head slider 21 rapidly increased. Although the flying head slider 56 also enjoyed an increased pitch angle α as the load beam 19 reduced the load below the threshold B, a sufficient increase in the pitch angle α could not be obtained unless the load beam 19 largely decreased the load as compared with the case of the flying head slider 21. It has been confirmed that the flying head slider 21 according to the invention reliably enjoys a rapid increase in the pitch angle α along with an increase in the roll angle.

Figure 9:
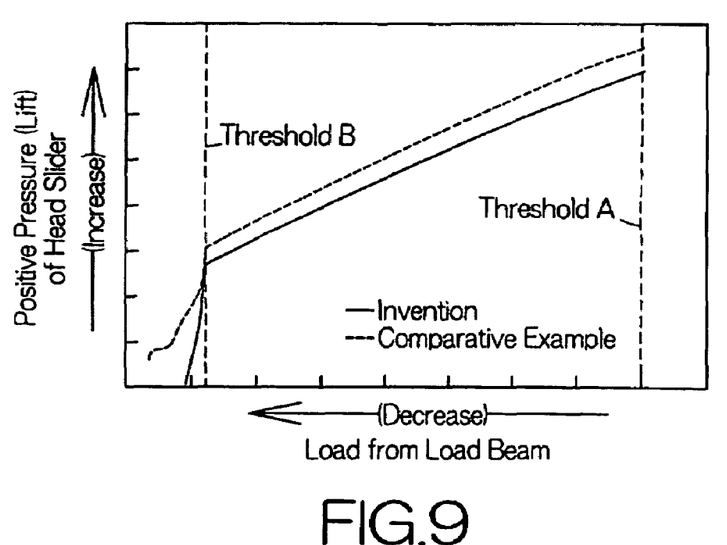
FIG. 9 is a graph illustrating changes in the positive pressures of the flying head sliders in response to a decrease in a load or urging force from the load beam.
Figure 10:
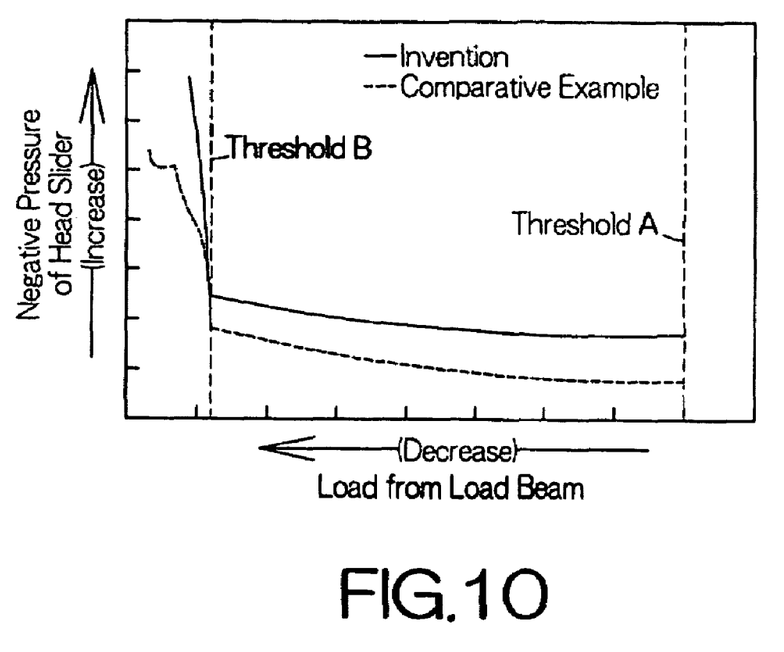
FIG. 10 is a graph illustrating changes in the negative pressures of the flying head sliders in response to a decrease in a load or urging force from the load beam.

Additionally, the inventors have observed changes in the lift or positive pressures of the flying head sliders 21, 56, respectively. As is apparent from FIG. 9, when the load bar 23 reached the predetermined elevation, corresponding to a threshold B, the positive pressure immediately disappeared on the flying head slider 21. The disappearance of the positive pressure represents a complete release of the flying head slider 21 from the effect of the rotating magnetic recording disk 13. The flying head slider 56 of the comparative example required a larger decrease in the load from the load beam 19 until the flying head slider 56 was completely released from the effect of the rotating magnetic recording disk 13. In other words, the flying head slider 56 cannot get distanced from the rotating magnetic recording disk 13 solely with the effect of the airflow acting on the flying head slider 56. The inventors have likewise observed changes in the negative pressures of the flying head sliders 21, 56, respectively. As is apparent from FIG. 10, when the load bar 23 reached the predetermined elevation, corresponding to a threshold B, the negative pressure immediately disappeared on the flying head slider 21. As is apparent from comparison between FIGS. 9 and 10, it has been confirmed that the positive pressure rather than the negative pressure largely changes based on a decrease in the load from the load beam 19.

What is claimed is:

1. A head slider comprising:
    a slider body defining a medium-opposed surface hemisected into first and second areas by a centerline extending in a longitudinal direction of the slider body;
    a first front air bearing surface defined on the first area of the medium-opposed surface at a position near an inflow end of the medium-opposed surface;
    a second front air bearing surface defined on the second area of the medium-opposed surface at a position near an inflow end of the medium-opposed surface; and
    a rear air bearing surface defined on the medium-opposed surface, said rear air bearing surface located closer to an outflow end of the medium-opposed surface than the first and second front air bearing surface, wherein
    the outflow end of the second front air bearing surface is located closer to the outflow end of the medium-opposed surface than to the outflow end of the first front air bearing surface, the inflow end of the second front air bearing surface is located closer to the outflow end of the medium-opposed surface than to the inflow end of the first front air bearing surface.

2. A head suspension assembly comprising:
    a load beam;
    a load bar extending in a forward direction from a front end of the load beam;
    a head slider supported on the load beam, said head slider including a slider body defining a medium-opposed surface hemisected into first and second areas by a centerline extending in a longitudinal direction of the slider body;
    a first front air bearing surface defined on the first area the medium-opposed surface at a position near an inflow end of the medium-opposed surface;
    a second front air bearing surface defined on the second area of the medium-opposed surface at a position near an inflow end of the medium-opposed surface; and
    a rear air bearing surface defined on the medium-opposed surface, said rear air bearing surface located closer to an outflow end of the medium-opposed surface than the first and second front air bearing surface, wherein
    the outflow end of the second front air bearing surface is located closer to the outflow end of the medium-opposed surface than to the outflow end of the first front air bearing surface, the inflow end of the second front air bearing surface is located closer to the outflow end of the medium-opposed surface than to the inflow end of the first front air bearing surface.

* * * * *